(12) United States Patent
Kida

(10) Patent No.: US 12,485,353 B2
(45) Date of Patent: Dec. 2, 2025

(54) TRADING SUPPORT SERVER, TRADING SUPPORT SYSTEM, AND TRADING SUPPORT PROGRAM

(71) Applicant: POLYGON TAILOR INC., Tokyo (JP)

(72) Inventor: Kazunari Kida, Tokyo (JP)

(73) Assignee: POLYGON TAILOR Inc., Tokyo (JP)

( * ) Notice: Subject to any disclaimer, the term of this patent is extended or adjusted under 35 U.S.C. 154(b) by 0 days.

(21) Appl. No.: 18/835,786

(22) PCT Filed: May 10, 2023

(86) PCT No.: PCT/JP2023/017502
§ 371 (c)(1),
(2) Date: Aug. 5, 2024

(87) PCT Pub. No.: WO2024/232026
PCT Pub. Date: Nov. 14, 2024

(65) Prior Publication Data
US 2025/0161826 A1    May 22, 2025

(51) Int. Cl.
*A63F 13/85*     (2014.01)

(52) U.S. Cl.
CPC ........ *A63F 13/85* (2014.09); *A63F 2300/575* (2013.01)

(58) Field of Classification Search
None
See application file for complete search history.

(56) References Cited

U.S. PATENT DOCUMENTS

| | | | |
|---|---|---|---|
| 11,468,504 | B2 | 10/2022 | Imafuku |
| 2005/0137015 | A1* | 6/2005 | Rogers .................... A63F 13/12 463/42 |

(Continued)

FOREIGN PATENT DOCUMENTS

| | | |
|---|---|---|
| JP | 2009-157565 A | 7/2009 |
| JP | 2009-296159 A | 12/2009 |

(Continued)

OTHER PUBLICATIONS

Metaverse, "VRChat," VRChat Inc., retrieved from https://hello.vrchat.com/ on Aug. 8, 2024 (2 pages), which was available before the invention as claimed in the present application.

E-marketplace platform "Booth," pixiv Inc., with machine translation, retrieved from https://booth.pm/ja on Aug. 16, 2024 (8 pages), which was available before the invention as claimed in the present application.

(Continued)

*Primary Examiner* — Jason T Yen
(74) *Attorney, Agent, or Firm* — Oliff PLC

(57) ABSTRACT

A trading support server for items of a virtual space:

stores a seller who wishes to put up a sales item, the sales item, and an individual price, causes the seller to declare a parent item used to create the sales item, and stores information identifying the parent item, determines whether a parent item is associated with a specific item, and where a parent item is associated with the specific item, adds individual prices of the specific item and the parent item to a charged amount, and adds the individual price of the specific item to a sales amount of a seller of the specific item, and the individual price of the parent item to a sales amount of a seller of the parent item where the purchaser has paid the charged amount having the individual prices of both the specific item and the parent item added.

12 Claims, 10 Drawing Sheets

(56) References Cited

U.S. PATENT DOCUMENTS

| | | | |
|---|---|---|---|
| 2008/0220876 A1* | 9/2008 | Mehta | A63F 13/12 |
| | | | 707/E17.014 |
| 2009/0300036 A1 | 12/2009 | Nagasaki | |
| 2021/0365909 A1 | 11/2021 | Shiina | |
| 2022/0314125 A1* | 10/2022 | Koch | A63F 13/79 |
| 2024/0181349 A1 | 6/2024 | Lee | |

FOREIGN PATENT DOCUMENTS

| | | |
|---|---|---|
| JP | 2021-189475 A | 12/2021 |
| JP | 2022-62975 A | 4/2022 |
| KR | 10-2021-0046069 A | 4/2021 |
| KR | 10-2021-0053762 A | 5/2021 |
| KR | 10-2022-0146298 A | 11/2022 |

OTHER PUBLICATIONS

International Search Report issued in corresponding International Application No. PCT/JP2023/017502, date of mailing Jun. 20, 2023 (3 pages).

Written Opinion of the International Searching Authority issued in corresponding International Application No. PCT/JP2023/017502, date of mailing Jun. 20, 2023 (5 pages).

Skeb, Virtual Life Magazine, dated Mar. 2, 2021, retrieved from https://vr-lifemagazine.com/polygontailor/ on Jul. 16, 2024 (17 pages).

Notice of Reasons for Refusal, with machine translation, issued in corresponding Japan Application No. 2023-559104, dated Oct. 31, 2023 (14 pages).

Decision of Refusal, with machine translation, issued in corresponding Japan Application No. 2023-559104, dated Jan. 16, 2024 (8 pages).

* cited by examiner

| USER TABLE 132 | | |
|---|---|---|
| USER ID | USER REGISTRATION DETAILS | SALES AMOUNT |
| USER 1 | EMAIL ADDRESS 1, PASSWORD 1, PAYEE ACCOUNT 1, ... | ¥20,000 |
| USER 2 | EMAIL ADDRESS 2, PASSWORD 2, PAYEE ACCOUNT 2, ... | ¥8,000 |
| USER 3 | EMAIL ADDRESS 3, PASSWORD 3, PAYEE ACCOUNT 3, ... | ¥3,000 |
| USER 4 | EMAIL ADDRESS 4, PASSWORD 4, PAYEE ACCOUNT 4, ... | ¥1,000 |
| USER 5 | EMAIL ADDRESS 5, PASSWORD 5, PAYEE ACCOUNT 5, ... | ¥0 |
| USER 6 | EMAIL ADDRESS 6, PASSWORD 6, PAYEE ACCOUNT 6, ... | ¥0 |

FIG. 4

ITEM TABLE 133

| ITEM ID OF SALES ITEM | USER ID OF SELLER USER | INDIVIDUAL PRICE | STORAGE LOCATION OF 3D MODELING DATA | NUMBER OF SALES |
|---|---|---|---|---|
| ITEM 1 | USER 1 | ¥5,000 | ADDRESS 1 | 4 |
| ITEM 2 | USER 2 | ¥2,000 | ADDRESS 2 | 4 |
| ITEM 3 | USER 3 | ¥1,000 | ADDRESS 3 | 3 |
| ITEM 4 | USER 4 | ¥500 | ADDRESS 4 | 2 |

FIG. 5

| MODIFYING TREE TABLE 134 | | |
|---|---|---|
| MODIFYING TREE ID | ITEM ID OF SALES ITEM | ITEM ID OF PARENT ITEM |
| MODIFYING TREE 1 | ITEM 3 | ITEM 2 |
| MODIFYING TREE 2 | ITEM 4 | ITEM 3 |
| MODIFYING TREE 3 | ITEM 4 | ITEM 1 |

FIG. 6

PURCHASE HISTORY TABLE 135

| PURCHASE HISTORY ID | USER ID OF PURCHASER USER | ITEM ID OF CHARGED ITEM | PAYMENT ID | PURCHASE DATE/TIME |
|---|---|---|---|---|
| PURCHASE HISTORY 1 | USER 3 | ITEM 1 | PAYMENT 1 | JANUARY 1, 2023, 0:00 |
| PURCHASE HISTORY 2 | USER 3 | ITEM 2 | PAYMENT 2 | JANUARY 1, 2023, 1:00 |
| PURCHASE HISTORY 3 | USER 4 | ITEM 1 | PAYMENT 3 | JANUARY 1, 2023, 2:00 |
| PURCHASE HISTORY 4 | USER 4 | ITEM 3 | PAYMENT 4 | JANUARY 1, 2023, 3:00 |
| PURCHASE HISTORY 5 | USER 4 | ITEM 2 | PAYMENT 4 | JANUARY 1, 2023, 3:00 |
| PURCHASE HISTORY 6 | USER 5 | ITEM 1 | PAYMENT 5 | JANUARY 1, 2023, 3:00 |
| PURCHASE HISTORY 7 | USER 5 | ITEM 4 | PAYMENT 6 | JANUARY 1, 2023, 4:00 |
| PURCHASE HISTORY 8 | USER 5 | ITEM 3 | PAYMENT 6 | JANUARY 1, 2023, 4:00 |
| PURCHASE HISTORY 9 | USER 5 | ITEM 2 | PAYMENT 6 | JANUARY 1, 2023, 4:00 |
| PURCHASE HISTORY 10 | USER 6 | ITEM 4 | PAYMENT 7 | JANUARY 1, 2023, 5:00 |
| PURCHASE HISTORY 11 | USER 6 | ITEM 1 | PAYMENT 7 | JANUARY 1, 2023, 5:00 |
| PURCHASE HISTORY 12 | USER 6 | ITEM 3 | PAYMENT 7 | JANUARY 1, 2023, 5:00 |
| PURCHASE HISTORY 13 | USER 6 | ITEM 2 | PAYMENT 7 | JANUARY 1, 2023, 5:00 |

PAYMENT 5 { PURCHASE HISTORY 6 }
PAYMENT 6 { PURCHASE HISTORY 7–9 }
PAYMENT 7 { PURCHASE HISTORY 10–13 }

FIG. 7

PAYMENT TABLE 136

| PAYMENT ID | USER ID | PAYMENT AMOUNT | PAYMENT DATE/TIME |
|---|---|---|---|
| PAYMENT 1 | USER 3 | ¥5,000 | JANUARY 1, 2023, 0:00 |
| PAYMENT 2 | USER 3 | ¥2,000 | JANUARY 1, 2023, 1:00 |
| PAYMENT 3 | USER 4 | ¥5,000 | JANUARY 1, 2023, 2:00 |
| PAYMENT 4 | USER 4 | ¥3,000 | JANUARY 1, 2023, 3:00 |
| PAYMENT 5 | USER 5 | ¥5,000 | JANUARY 1, 2023, 3:00 |
| PAYMENT 6 | USER 5 | ¥3,500 | JANUARY 1, 2023, 4:00 |
| PAYMENT 7 | USER 6 | ¥8,500 | JANUARY 1, 2023, 5:00 |

FIG. 8

TRADING SUPPORT SERVER, TRADING SUPPORT SYSTEM, AND TRADING SUPPORT PROGRAM

TECHNICAL FIELD

The present invention relates to a trading support server, a trading support system including the trading support server, and a trading support program that support user-to-user trading of items which are electronic data (e.g. 3D modeling data) to be used in a virtual space.

BACKGROUND ART

There is a known e-marketplace platform (see Patent Document 2, etc.) where 3D modeling data such as avatars that can be introduced into a metaverse (see Patent Document 1, etc.) which is one type of virtual space is traded. Users of the platform can upload 3D modeling data of avatars created on their communication devices to the platform, and put up the 3D modeling data for sale to other users. When another user who likes a sales avatar purchases the avatar through the platform, the user is permitted to download the 3D modeling data from the platform. The user (purchaser user) who purchased the avatar can participate in a community using the avatar as her/his own avatar character by introducing, into a metaverse, the 3D modeling data downloaded to her/his communication device.

On the other hand, an administrator of the platform transfers an amount of a currency corresponding to a sales amount of the avatar minus a predetermined fee to a user (seller user) who put up the avatar for sale. Therefore, the seller user can surely receive a consideration for the service of creating the avatar. Then, as the number of users (purchaser users) who purchase avatars increases, rewards that the seller user can receive increase.

CITATION LIST

Non Patent Literatures

Non Patent Literature 1: Metaverse "VRChat," VRChat Inc., [Searched on Apr. 12, 2023], the Internet <URL: https://hello.vrchat.com/>

Non Patent Literature 2: e-marketplace platform "BOOTH," pixiv Inc., [Searched on Apr. 12, 2023], the Internet <URL: https://booth.pm/ja>

SUMMARY OF INVENTION

Technical Problem

Meanwhile, in recent years, a large number of users who edit, as their own work, 3D modeling data of purchased avatars on their own communication devices, create changed avatars, and use the avatars in a metaverse has appeared. For example, an example of such users is a user who performs processing (modeling) of the body shape of an avatar which is a ready-made item on her/his own communication device, and changes the body shape as she/he likes, or is a user who performs attachment (modification) of a hairstyle (hairstyle) or a costume which is a ready-made item to an avatar which is a ready-made item, and changes the avatar into a custom avatar of her/his own. The changed avatars reflect ideas or taste of the users who performed the modeling or the attachment, but are not permitted to be traded as a rule. Accordingly, the users who made the changes have not been able to receive profits. This is because there are no mechanisms to redistribute profits to creators of items (parent items) used to create changed avatars.

The present invention has been made in view of the problems mentioned above, and an object thereof is to provide: a trading support server that supports user-to-user trading of items which are electronic data to be used in a virtual space, and can protect profits of both seller users of the items and seller users of parent items used to create the items; a trading support system including the trading support server; and a trading support program.

Solution to Problem

A trading support server according to the present invention for solving the problems described above is a trading support server that supports user-to-user trading of items which are electronic data to be used in a virtual space, the trading support server including: an item management part that executes a process of storing, in association with each other on a storing part, a user (hereinafter, referred to as a "seller user") who wishes to put up an item (hereinafter, referred to as a "sales item") for sale, the sales item that the seller user puts up for sale, and a price (hereinafter, referred to as an "individual price") that should be reflected in a sales amount of the seller user when the sales item is traded; a tree management part that executes a process of causing the seller user to declare an item (hereinafter, referred to as a "parent item") used to create the sales item, and storing, on the storing part, information for identifying the parent item in association with the sales item; a charging part that executes a process of determining whether or not a parent item is associated with at least one of sales item (hereinafter, referred to as a "specific item") on a basis of information stored on the storing part in a case where a user (hereinafter, referred to as a "purchaser user") who wishes to purchase the specific item has appeared, and in a case where a parent item is associated with the specific item, adding individual prices of both the specific item and the parent item to a charged amount of the purchaser user; and a distributing part that executes a process of adding the individual price of the specific item to a sales amount of a seller user of the specific item and a process of adding the individual price of the parent item to a sales amount of a seller user of the parent item in a case where the purchaser user has paid the charged amount to which the individual prices of both the specific item and the parent item are added.

In one of the trading support server according to the present invention for solving the problems described above, purchase history information representing a purchase history of a plurality of users may be pre-stored on the storing part, and even in a case where a parent item is associated with the specific item, the charging part may not add an individual price of the parent item to the charged amount provided that it is determined on a basis of the purchase history information that the purchaser user has purchased the parent item.

In one of the trading support server according to the present invention for solving the problems described above, in a case where it is determined on a basis of information stored on the storing part that a superior rank parent item is further associated with the parent item, the charging part adds also an individual price of the superior rank parent item to the charged amount.

In one of the trading support server according to the present invention for solving the problems described above, the tree management part may cause the seller user to declare the parent item even in a case where only part of the parent item is used to create the sales item.

In one of the trading support server according to the present invention for solving the problems described above, the virtual space may be a metaverse, and the electronic data may include 3D modeling data of an avatar which is a type of object that can be used in the metaverse, and 3D modeling data of an additional item for the avatar.

A trading support system according to the present invention for solving the problems described above includes: the trading support server according to the present invention; and a data server that stores electronic data of a plurality of sales items put up for sale by a plurality of the seller users.

A computer-readable trading support program according to the present invention for solving the problems described above is a computer-readable trading support program that causes a computer to function as a trading support server that supports user-to-user trading of items which are electronic data to be used in a virtual space, the computer-readable trading support program causing the computer to execute: a process of storing, in association with each other on a storing part, a user (hereinafter, referred to as a "seller user") who wishes to put up an item (hereinafter, referred to as a "sales item") for sale, the sales item that the seller user puts up for sale, and a price (hereinafter, referred to as an "individual price") that should be reflected in a sales amount of the seller user when the sales item is traded; a process of causing the seller user to declare an item (hereinafter, referred to as a "parent item") used to create the sales item, and storing, on the storing part, information for identifying the parent item in association with the sales item; a process of determining whether or not a parent item is associated with at least one of sales item (hereinafter, referred to as a "specific item") on a basis of information stored on the storing part in a case where a user (hereinafter, referred to as a "purchaser user") who wishes to purchase the specific item has appeared, and in a case where a parent item is associated with the specific item, adding individual prices of both the specific item and the parent item to a charged amount of the purchaser user; and a process of adding the individual price of the specific item to a sales amount of a seller user of the specific item and a process of adding the individual price of the parent item to a sales amount of a seller user of the parent item in a case where the purchaser user has paid the charged amount to which the individual prices of both the specific item and the parent item are added.

Advantageous Effects of Invention

The trading support server according to the present invention, the trading support system according to the present invention, or the trading support program according to the present invention supports user-to-user trading of items which are electronic data to be used in a virtual space, and manages, in association with seller users on a storing part, individual prices that should be reflected in sales amounts of seller users when sales items are traded, and parent items used to create the sales items.

Then, on the basis of information stored on the storing part, the trading support server according to the present invention, the trading support system according to the present invention, or the trading support program according to the present invention can identify a parent item of a specific item, an individual price of the parent item, and a seller user of the parent item in a case where a purchaser user who wishes to purchase the specific item has appeared. Accordingly, it is possible to charge the purchaser user individual prices of both the specific item and the parent item, add the individual price of the specific item to a sales amount of the seller user of the specific item, and add a sales amount of the parent item to a sales amount of the seller user of the parent item.

Accordingly, the trading support server according to the present invention, the trading support system according to the present invention, or the trading support program according to the present invention provides an advantageous effect that profits of both seller users of items and seller users of parent items used to create the items can be protected.

BRIEF DESCRIPTION OF DRAWINGS

FIG. 4 is an explanatory diagram for explaining the configuration of a user table.

FIG. 5 is an explanatory diagram for explaining the configuration of an item table.

FIG. 6 is an explanatory diagram for explaining the configuration of a modifying tree table.

FIG. 7 is an explanatory diagram for explaining the configuration of a purchase history table.

FIG. 8 is an explanatory diagram for explaining the configuration of a payment table.

DESCRIPTION OF EMBODIMENTS

Hereinbelow, an embodiment of a trading support server according to the present invention, a trading support system according to the present invention, or a computer-readable trading support program according to the present invention is explained with reference to the figures.

1. Trading Support System

First, the schematic configuration of a trading system of the present embodiment is explained. The trading support system provides, to a plurality of users, an e-marketplace platform for items which are objects that can be used in a metaverse.

Figure 1:
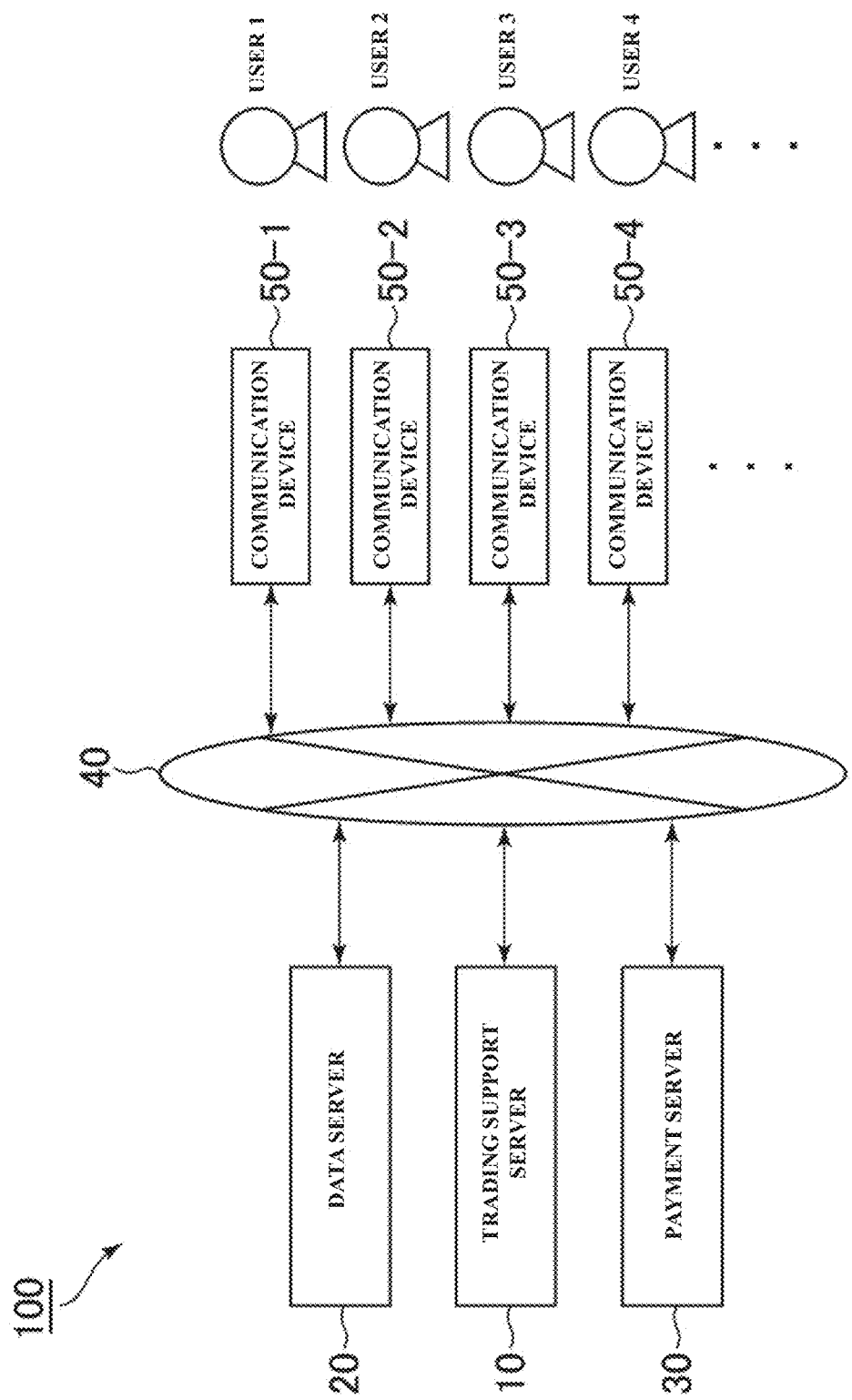
FIG. 1 is a schematic block diagram for explaining the schematic configuration of a trading support system according to an embodiment.

FIG. 1 is a schematic block diagram for explaining the schematic configuration of the trading support system according to one preferable embodiment. As depicted in FIG. 1, a trading support system 100 includes a trading support server 10, a data server 20, a payment server 30, and the like, and these trading support server 10, data server 20, and payment server 30 are connected to a plurality of communication devices 50-1, 50-2, . . . via a communication network 40 such as the Internet.

The plurality of communication devices 50-1, 50-2, . . . are terminal devices that a plurality of User 1, User 2, User 3, User 4, . . . preregistered in the trading support server 10 use individually (Note that "User 1," "User 2," "User 3," "User 4,". . . are user IDs for making distinctions among the users.).

Each of the communication devices 50-1, 50-2, . . . is configured using a desktop PC, a laptop PC, a tablet PC, a smartphone, a home game machine, or the like, and, for example, application programs (including a web browser, a game program, or the like) that are pre-installed or provided from the trading support server 10 are pre-installed on each of the communication devices 50-1, 50-2, . . . . By using display devices/input devices or the like mounted on the terminal devices 50-1, 50-2, . . . , and the like, the application programs cause the communication devices 50-1, 50-2, . . . to function as user interfaces that are required at the time when users are registered, items are put up for sale, items are purchased, and so on.

The trading support server 10 is a server device that supports user-to-user trading of items which are 3D modeling data of objects to be used in a virtual space. The traded items include 3D modeling data of avatars which are character objects to be used as avatars of users in a metaverse, and 3D modeling data of items (costumes, hairstyles, etc.) which are additional objects for the avatars. Details of the trading support server 10 are mentioned later.

The data server 20 executes a process of storing a file of 3D modeling data of sales items uploaded from a communication device 50-i of a seller user i who is any one of the plurality of Users 1, 2, . . . in accordance with an instruction from the trading support server 10 and a process of causing a file of 3D modeling data which is a purchased item to be downloaded to a communication device 50-j of a purchaser user j who is any one of the plurality of Users 1, 2, . . . . Note that an administrator of the data server 20 may be the same person as an administrator of the trading support server 10, or may be another person (a file storage company, etc.).

The payment server 30 is a server device that executes a process that is required at the time when the purchaser user j pays (makes a payment of) a purchase price of an item to the side of the administrator of the trading support server 10 via the communication device 50-j. Note that an administrator of the payment server 30 may be the same person as the administrator of the trading support server 10, or may be another person (a payment agent company, etc.).

2. Trading Support Server

Figure 2:
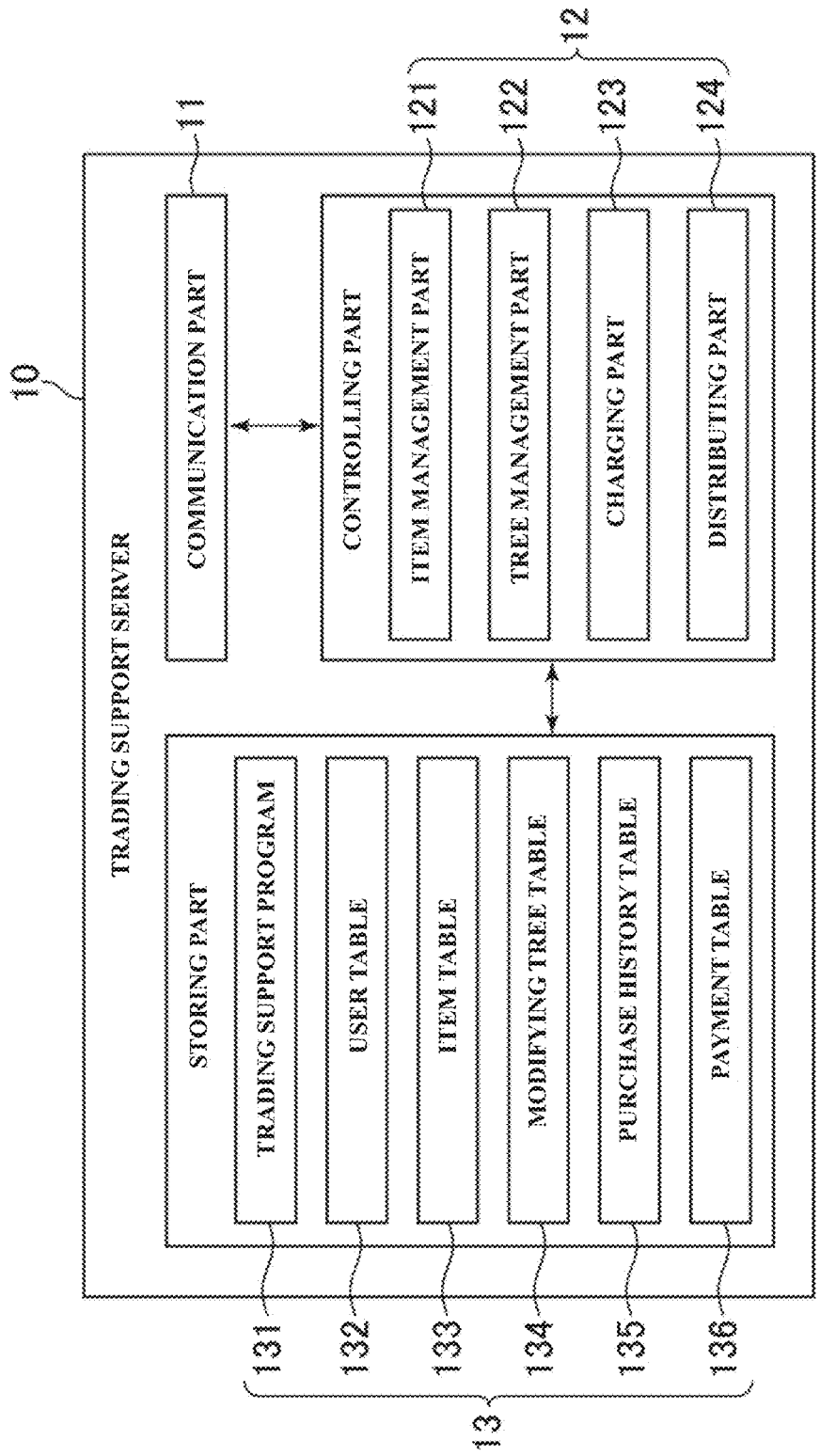
FIG. 2 is a schematic block diagram for explaining the configuration of a trading support server.

Next, the schematic configuration of the trading support server of the present embodiment is explained. FIG. 2 is a schematic block diagram for explaining the configuration of the trading support server. As depicted in FIG. 2, the trading support server 10 includes a communication part 11, a controlling part 12, and a storing part 13.

The communication part 11 is a communication interface for the trading support server 10 to transmit and receive data to and from the data server 20, the payment server 30, and the communication devices 50-1, 50-2, . . . via the communication network 40.

The storing part 13 is a storage device that stores programs and data required for processes performed by the trading support server 10, and is a storage device disposed inside or outside the trading support server 10. A trading support program 131, a user table 132, an item table 133, a modifying tree table 134, a purchase history table 135, a payment table 136, and the like are stored on the storing part 13.

The controlling part 12 is a processor (CPU) that executes various types of process by executing the trading support program 131, and functions as an item management part 121, a tree management part 122, a charging part 123, or a distributing part 124 as appropriate.

The item management part 121 executes a process of causing the seller user i to input an individual price that should be reflected in her/his sales amount when a sales item is traded, and storing information about the individual price in the item table 133 (FIG. 5) of the storing part 13 in association with the sales item and the seller user i.

The tree management part 122 executes a process of causing the seller user i to declare a parent item used to create a sales item, and storing information (a modifying tree mentioned later) for identifying the parent item in the modifying tree table 134 (FIG. 6) of the storing part 13 in association with the sales item.

Note that it is assumed that the tree management part 122 causes the seller user i to declare a parent item even in a case where only part of the parent item is used to create a sales item. For example, the tree management part 122 causes the display device of the communication device 50-i of the seller user i to display a list of sales items that have been put up for sale by then, and prevents the seller user i from forgetting to declare by additionally displaying a precautionary statement that "In a case where there are one or more items used to create an item which you are about to put up for sale, please do not forget to declare all the items even if you used only a partial item of any of the items." or the like. This is for protecting profits of users who put up parent items for sale.

In a case where the purchaser user j who wishes to purchase at least one (specific item") of sales items has appeared, the charging part 123 executes a process of determining whether or not a parent item is associated with the specific item on the basis of information of the modifying tree table 134 stored on the storing part 13, and, in a case where a parent item is associated with the specific item, adding individual prices of both the specific item and the parent item to a charged amount of the purchaser user j on the basis of information of the item table 133 stored on the storing part 13.

Note that, in a case where it is determined that the parent item is further associated with a superior rank parent item on the basis of the information stored in the modifying tree table 134, the charging part 123 further adds (includes) an individual price of the superior rank parent item to the charged amount of the purchaser user j.

It should be noted that, even in a case the specific item is associated with parent items, the charging part 123 does not add (does not include) an individual price of at least one parent item to the charged amount of the purchaser user j provided that it is determined on the basis of the purchase history table 135 that the purchaser user j has purchased the parent item.

In a case where the purchaser user j has paid the charged amount to which the individual prices of both the specific item and at least one parent item are added, the distributing part 124 executes a process of adding the individual price of the specific item to a sales amount of a seller user of the specific item, and a process of adding the individual price of the at least one parent item to a sales amount of a seller user of the parent item.

Specifically, the distributing part 124 refers to the item table 133 depending on all the items related to the charging, increments the number of sales of each relevant item, and adds (includes) the product value of the number of sales of each relevant item and an individual price of the relevant item to a sales amount of a relevant user in the user table 132.

3. Specific Examples of Sales Items

Figure 3:
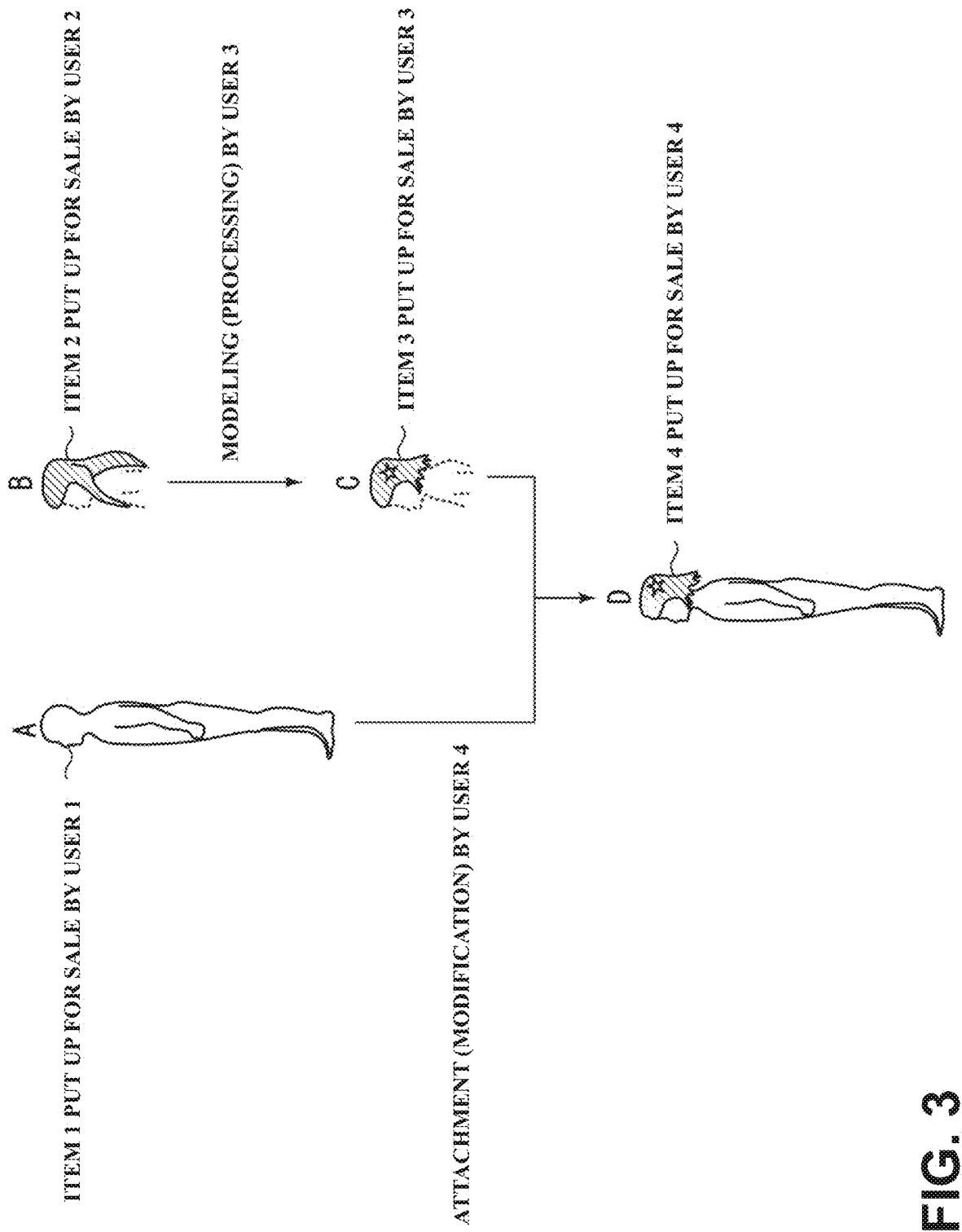
FIG. 3 is an explanatory diagram for explaining Items 1 to 4.

Here, for making the explanation easy-to-understand, a case depicted in FIG. 3 where Users 1 to 4 individually put up Items A to D for sale is mentioned as an example. FIG. 3 is an explanatory diagram for explaining Items 1 to 4. "Item 1", "Item 2", "Item 3", and "Item 4" are item IDs of the respective items.

Item 1: Avatar A created by User 1 without using another item.

Item 2: Long-hair hairstyle B created by User 2 without using another item.

Item 3: Short-hair hairstyle C created by User 3 by modeling of the 3D modeling data of the long-hair hairstyle B.

Item 4: Avatar D created by User 4 by attachment of the short-hair hairstyle C to Avatar A.

4. User Table

Next, the user table is explained. FIG. 4 is an explanatory diagram for explaining the configuration of the user table. As depicted in FIG. 4, information such as user registration details or a sales amount of the user is stored for each user in the user table 132. The user registration details in the information are user-specific information such as an email address, a password, or a payee account. On the other hand, the sales amount of the user is a sales amount of items (sales items) that the user has put up for sale. The specific breakdowns of sales amounts are as follows.

Sales Amount of User 1

The product value, which is 20,000 yen, of the number of sales "4" of Item 1 (=Avatar A) and an individual price 5,000 yen of Item 1 (=Avatar A) (Note that the number of sales and individual price of Item 1 are stored in the item table 133 mentioned later.).

Sales Amount of User 2

The product value, which is 8,000 yen, of the number of sales "4" of Item 2 (=Hairstyle B) and an individual price 2,000 yen of Item 2 (=Hairstyle B) (Note that the number of sales and individual price of Item 2 are stored in the item table 133 mentioned later.).

Sales Amount of User 3

The product value, which is 3,000 yen, of the number of sales "3" of Item 3 (=Hairstyle C) and an individual price 1000 yen of Item 3 (=Hairstyle C) (Note that the number of sales and individual price of Item 3 are stored in the item table 133 mentioned later.).

Sales Amount of User 4

The product value, which is 1,000 yen, of the number of sales "2" of Item 4 (=Avatar D) and an individual price 500 yen of Item 4 (=Avatar D) (Note that the number of sales and individual price of Item 4 are stored in the item table 133 mentioned later.).

Note that timings at which the user table 132 is updated are timings at which users are registered, timings at which user registration details are changed, timings at which items are traded (the prices of items are paid), and the like.

Here, for simplification of explanation, it is assumed that information about sales amounts stored in the user table 132 is sales amounts until the current time point from the previous closing date. Also, it is assumed that when a predetermined closing date such as the last day of a month has come and amounts of money of a currency corresponding to the sales amounts minus fees are transferred to user-specified payee accounts (the settlement is completed), the sales amounts in the user table 132 are reset to zero.

5. Item Table

Next, the item table is explained. FIG. 5 is an explanatory diagram for explaining the configuration of the item table. As depicted in FIG. 5, information such as a seller user, an individual price, the storage location of 3D modeling data, or the number of sales is stored for each sales item in the item table 133.

In the example depicted in FIG. 5, the individual price of Item 1 (=Avatar A) is 5,000 yen, the individual price of Item 2 (=Hairstyle B) is 2,000 yen, the individual price of Item 3 (=Hairstyle C) is 1,000 yen, and the individual price of Item 4 (=Avatar D) is 500 yen.

For example, timings at which the item table 133 is updated are timings when items are put up for sale, timings at which items are traded, and the like.

Here, for simplification of explanation, it is assumed that information about the numbers of sales stored in the item table 133 is the numbers of sales until the current time point from the previous closing date. Also it is assumed that when a predetermined closing date such as the last day of a month has come and the settlement described above is completed, the numbers of sales in the item table 133 are reset to zero.

6. Modifying Tree Table

Next, the modifying tree table is explained. FIG. 6 is an explanatory diagram for explaining the configuration of the modifying tree table. As depicted in FIG. 6, a modifying tree is stored for each sales item in the modifying tree table 134. Timings at which modifying trees in the modifying tree table 134 are updated are timings at which items are put up for sale, and the like.

Here, a "modifying tree" has a tree structure in which a sales item and parent items which are one or more items used to create the sales item are associated with each other.

6-1. When Avatar A is Put Up for Sale

In a case where a sales item is Item 1 (=Avatar A), another item is not used to create Item 1 (=Avatar A), and accordingly a modifying tree related to Item 1 (=Avatar A) is not stored in the modifying tree table 134.

6-2. When Hairstyle B is Put Up for Sale

In a case where a sales item is Item 2 (=Hairstyle B), another item is not used to create Item 2 (=Hairstyle B), and accordingly a modifying tree related to Item 2 (=Hairstyle B) is not stored in the modifying tree table 134.

6-3. When Hairstyle C is Put Up for Sale

In a case where a sales item is Item 3 (=Hairstyle C), Item 2 (=Hairstyle B) is used to create Item 3 (=Hairstyle C), and accordingly the following modifying tree is stored in the modifying tree table 134 as a modifying tree of Item 3 (=Hairstyle C).

Modifying Tree 1: Modifying tree in which Item 3 (=Hairstyle C) is associated with Item 2 (=Hairstyle B), which is a parent item thereof (Note that "Modifying Tree 1" is a modifying tree ID.).

6-4. When Avatar D is Put Up for Sale

In a case where a sales item is Item 4 (=Avatar D), Item 3 (=Hairstyle C) and Item 1 (=Avatar A) are used to create Item 4 (=Avatar D), and accordingly the following two modifying trees are stored in the modifying tree table 134 as modifying trees of Item 4 (=Avatar D).

Modifying Tree 2: Modifying tree in which Item 4 (=Avatar D) is associated with Item 3 (=Hairstyle C) (Note that "Modifying Tree 2" is a modifying tree ID.).

Modifying Tree 3: Modifying tree in which Item 4 (=Avatar D) is associated with Item 1 (=Avatar A) (Note that "Modifying Tree 3" is a modifying tree ID.).

7. Purchase History Table

Next, the purchase history table is explained. FIG. 7 is an explanatory diagram for explaining the configuration of the purchase history table representing purchase history information about a plurality of users. As depicted in FIG. 7, information such as a purchaser user, a purchase date/time, or an item (charged item) which is the target of charging is recorded for each payment in the purchase history table 135.

Such a purchase history table 135 makes it possible to check a breakdown (charged item/purchaser user) of an individual payment as necessary, and makes it possible to identify items currently owned by each of Users 1, 2, . . . (items purchased in the past).

Timings at which the purchase history table 135 is updated are timings when purchase prices of items are paid. Note that "Payment 1", "Payment 2", . . . , "Payment 7" in FIG. 7 are payment IDs.

7-1. About Payment 5

For example, "Payment 5" in FIG. 7 is a payment made when User 5 who had never purchased any item has purchased Item 1 (=Avatar A) for the first time (Note that "Payment 5" is a payment ID.).

Item 1 (=Avatar A) which is the purchased item related to Payment 5 does not have a parent item (see FIG. 5), and accordingly User 5 must have been charged only the individual price of Item 1 (=Avatar A). Therefore, only Item 1 (=Avatar A) is recorded as a charged item of Payment 5.

7-2. About Payment 6

For example, "Payment 6" in FIG. 7 is a payment made when User 5 who had purchased Item 1 (=avatar) has purchased Item 4 (=Avatar D).

Item 4 (=Avatar D) which is the purchased item related to Payment 6 has Items 1, 3, and 2 as parent items (see FIG. 5), but Item 1 among them had been purchased by User 5. Therefore, Items 4, 3, and 2 excluding Item 1 are recorded as charged items of "Payment 6".

7-3. About Payment 7

For example, "Payment 7" in FIG. 7 is a payment made when User 6 who had never purchased any item has purchased Item 4 (=Avatar D) for the first time.

Item 4 (=Avatar D), which is the purchased item related to Payment 7, has Items 1, 3, and 2 as parent items (see FIG. 5), and User 6 had purchased none of them. Therefore, all of Items 4, 1, 3, and 2 are recorded as charged items of "Payment 7".

8. Payment Table

Next, the payment table is explained. FIG. 8 is an explanatory diagram for explaining the configuration of the payment table. As depicted in FIG. 8, information such as a user who has made a payment, a payment amount, or a payment date/time is recorded for each payment in the payment table 136. These pieces of information are mainly information notified from the payment server 30 to the trading support server 10. For example, timings at which the payment table 136 is updated are timings after users have paid charged amounts.

9. Procedure to be Performed When Item is Put Up for Sale

Figure 9:
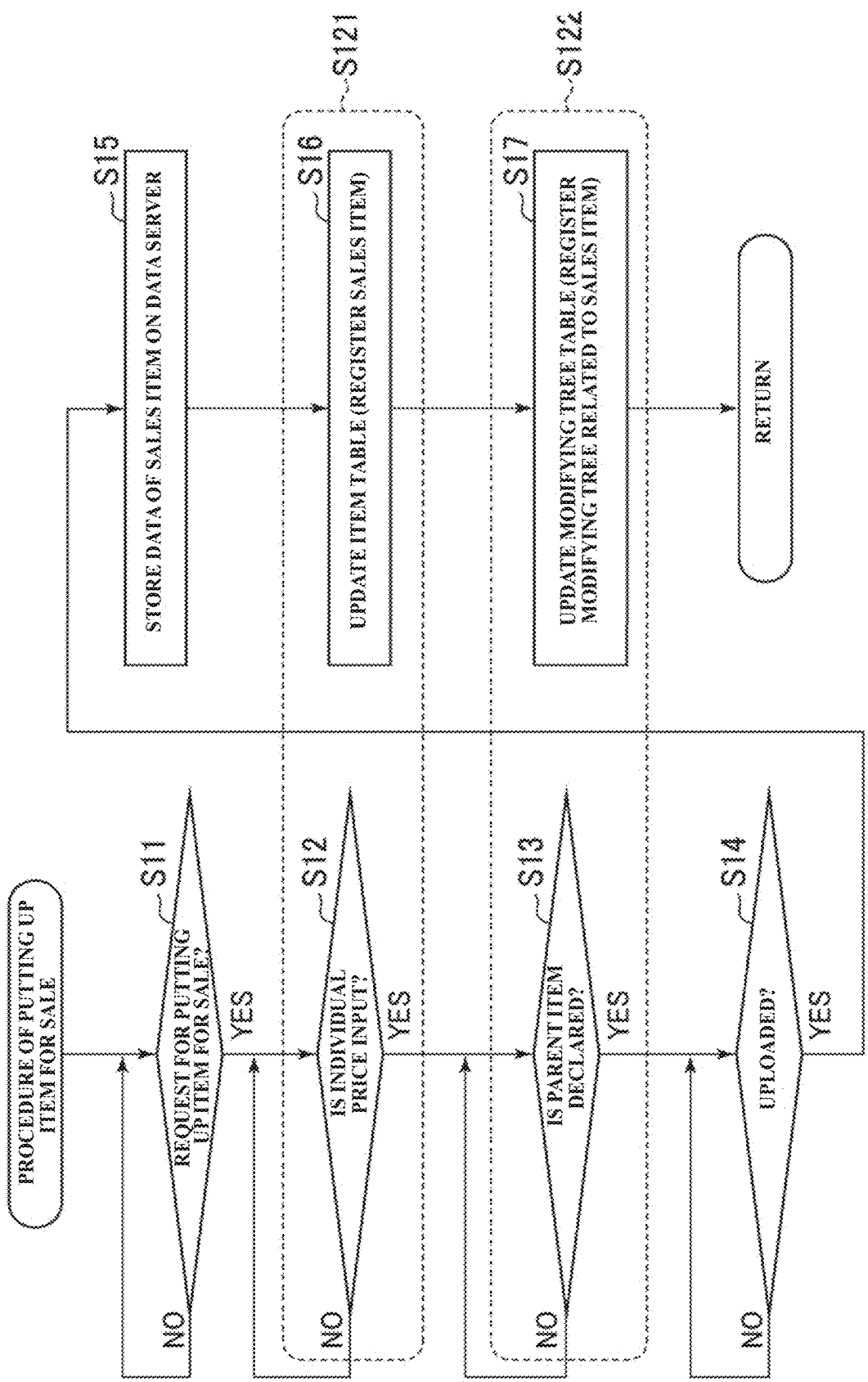
FIG. 9 is a flowchart for explaining a procedural flow to be followed when an item is put up for sale.

Hereinbelow, a procedure to be performed when an item is put up for sale is explained assuming that a user (seller user) who wishes to put up the item (sales item) for sale is User 4 and the item put up for sale is Item 4. FIG. 9 is a flowchart for explaining the procedural flow to be followed when an item is put up for sale. As depicted in FIG. 9, the controlling part 12 of the trading support server 10 executes the following Steps S11 to S17 when an item is put up for sale. Note that the reference sign S121 in FIG. 9 denotes processes performed mainly by the item management part 121, and the reference sign S122 in FIG. 9 denotes processes performed mainly by the tree management part 122.

Step S11: The controlling part 12 determines whether or not a request for putting up an item for sale is received from a communication device (communication device 50-4) of the seller user (User 4). In a case where the request is received (Step S11: YES), the procedure proceeds to the next Step S12, and in a case where the request is not received (Step S11: NO), the procedure waits.

Step S12: The controlling part 12 determines whether or not information about the individual price (500 yen) of the sales item (Item 4) is received from the communication device (communication device 50-4) of the seller user (User 4). In a case where the information is received (Step S12: YES), the procedure proceeds to the next Step S13, and in a case where the information is not received (Step S12: NO), the procedure waits.

Step S13: The controlling part 12 determines whether or not information about all parent items (Items 3 and 1) is received from the communication device (communication device 50-4) of the seller user (User 4). In a case where the information is received (Step S13: YES), the procedure proceeds to the next Step S14, and in a case where the information is not received (Step S13: NO), the procedure waits.

Step S14: The controlling part 12 determines whether or not a request for uploading a file of 3D modeling data of the sales item (Item 4) is received from the communication device (communication device 50-4) of the seller user (User 4). In a case where the request is received (Step S14: YES), the procedure proceeds to the next Step S15, and in a case where the request is not received (Step S14: NO), the procedure waits.

Step S15: The controlling part 12 causes the file of the 3D modeling data of the sales item (Item 4) to be uploaded to the data server 20 from the communication device (communication device 50-4) of the seller user (User 4). The uploaded 3D modeling data file is stored on the data server 20.

Step S16: The controlling part 12 stores the information about the seller user (User 4), the individual price (500 yen), the storage location of the 3D modeling data of the sales item (Item 4), and the like in the item table 133 in association with the sales item (Item 4). Thereby, the sales item (Item 4) is registered in the item table 133.

Step S17: The controlling part 12 stores the information about the parent items (Items 3 and 1) received from the communication device (communication device 50-4) of the seller user (User 4) in the modifying tree table 134 in association with the sales item (Item 4). Thereby, the modifying trees (Modifying Trees 2 and 3) of the sales item (Item 4) are registered in the modifying tree table 134.

Note that the order of Steps S11 to S17 mentioned above can be changed as appropriate. For example, the order of Steps S12 and S13 may be reversed, or the order of Steps S15, S16, and S17 may be changed.

10. Procedure to be Performed When Item is Purchased

Figure 10:
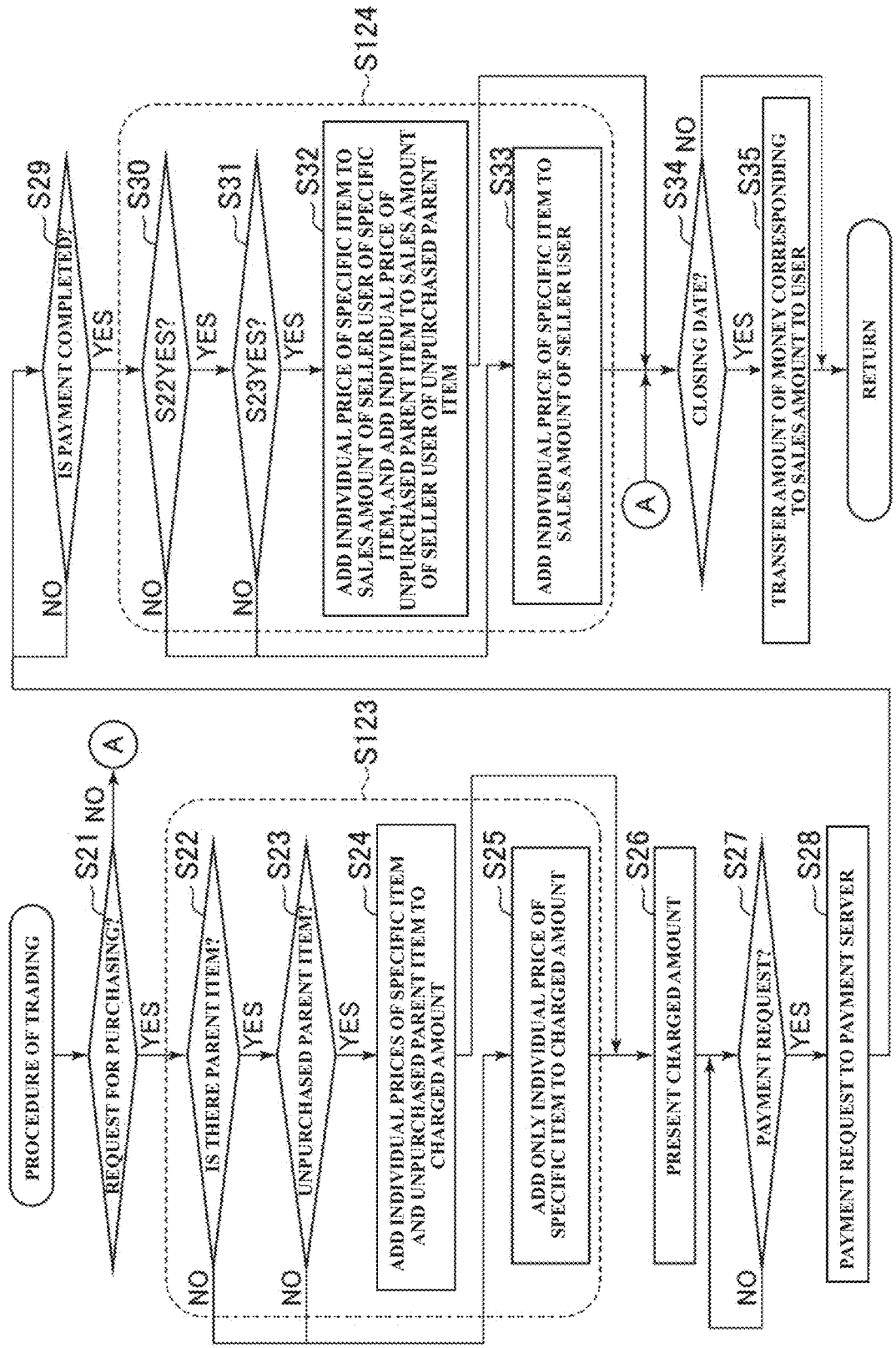
FIG. 10 is a flowchart for explaining a procedural flow to be followed when an item is traded.

Hereinbelow, a procedure to be performed when an item is purchased is explained assuming that a user (purchaser user) who wishes to purchase the item (specific item) is User 5 and the item that User 5 is about to purchase is Item 4. FIG. 10 is a flowchart for explaining the procedural flow to be followed when an item is traded. As depicted in FIG. 10, the controlling part 12 of the trading support server 10 executes the following Steps S21 to S35 when an item is purchased. Note that the reference sign S123 in FIG. 10 denotes processes performed mainly by the charging part 123, and the reference sign S124 in FIG. 10 denotes processes performed mainly by the distributing part 124.

Step S21: The controlling part 12 determines whether or not a request for purchasing a specific item (Item 4) is received from a communication device (communication device 50-5) of a purchaser user (User 5). In a case where the request is received (Step S21: YES), the procedure proceeds to the next Step S22, and in a case where the request is not received (Step S21: NO), the procedure proceeds to Step S34 mentioned later.

Step S22: The controlling part 12 identifies all parent items associated with the specific item (Item 4) by referring to the modifying tree table 134. In a case where there is at least one parent item (Step S22: YES), the procedure proceeds to Step S23, and in a case where there are no parent items (Step S22: NO), the procedure proceeds to Step S25. Here, since the parent items (Items 3, 1, and 2) are associated with Item 4 which is the specific item, the procedure proceeds to Step S23.

Step S23: The controlling part 12 refers to the purchase history table 135, and determines whether or not the purchaser user (User 5) has purchased any of the parent items (Items 3, 1, and 2) in the past. In a case where there is at least one unpurchased parent item (Step S23: YES), the procedure proceeds to Step S24, and in a case where there are no unpurchased parent items (Step S23: NO), the procedure proceeds to Step S25. Here, since the purchaser User 5 had not purchased the parent items (Items 3 and 2) at the time point before the purchaser User 5 purchases the specific item (Item 4), the procedure proceeds to Step S24.

Step S24: The controlling part 12 refers to the item table 133, and identifies the individual price (500 yen) of the specific item (Item 4) and the individual prices (1,000 yen, 2,000 yen) of the unpurchased (all) parent items (Items 3 and 2). And the controlling part 12 adds the individual price (500 yen) of the specific item (Item 4) and the individual prices (1,000 yen, 2,000 yen) of the unpurchased (all) parent items (Items 3 and 2) to the charged amount of the purchaser user (User 5), and the procedure proceeds to Step S26. The charged amount of User 5 is 3,500 yen.

Step S25: The controlling part 12 refers to the item table 133, and identifies the individual price of the specific item. And the controlling part 12 adds only the individual price to the charged amount of the purchaser user, and the procedure proceeds to Step S26.

Step S26: The controlling part 12 presents the charged amount (3,500 yen) on the communication device (communication device 50-5) of the purchaser user (User 5).

Step S27: The controlling part 12 determines whether or not a payment request is received from the communication device (communication device 50-5) of the purchaser user (User 5). In a case where the payment request is received (Step S27: YES), the procedure proceeds to the next Step S28, and in a case where the payment request is not received (Step S27: NO), the procedure waits.

Step S28: The controlling part 12 transmits the purchaser user (User 5), the charged amount (3,500 yen), and the payment request to the payment server 30. Note that, for simplification of explanation here, it is assumed that coupons are not used, points are not used, and discounts and the like are not applied.

Step S29: In a case where the controlling part 12 receives a payment completion notification from the payment server 30 (Step S29: YES), the procedure proceeds to the next Step S30, and in a case where the controlling part 12 does not receive a payment completion notification from the payment server 30 (Step S29: NO), the procedure waits. Note that when the controlling part 12 receives a payment completion notification, the controlling part 12 updates the payment table 136 by recording the purchaser user (User 5), the payment amount (3,500 yen), and the payment date/time related to the most recent payment (here, Payment 6) in the payment table 136.

Step S30: In a case where a result of the determination by the controlling part 12 at Step S22 is YES (Step S30: YES), the procedure proceeds to Step S31, and in a case where a result of the determination by the controlling part 12 at Step S22 is NO (Step S30: NO), the procedure proceeds to Step S33. Here, since the parent items (Items 3, 1, and 2) are associated with the specific item (Item 4), the procedure proceeds to Step S32.

Step S31: In a case where a result of the determination by the controlling part 12 at Step S23 is YES (Step S31: YES), the procedure proceeds to Step S32, and in a case where a result of the determination by the controlling part 12 at Step S23 is NO (Step S31: NO), the procedure proceeds to Step S33. Here, since User 5 before the payment has not purchased the parent items (Items 3 and 2), the procedure proceeds to Step S32.

Step S32: The controlling part 12 refers to the item table 133, identifies the seller user (User 4) and the individual price (500 yen) of the specific item (Item 4), and identifies the seller users (Users 3 and 2) of the unpurchased (all) parent items (Items 3 and 2), and the individual prices (1,000 yen, 2,000 yen) of the parent items (Items 3 and 2). Then, the controlling part 12 adds the individual price (500 yen) of the specific item (Item 4) to the sales amount of the seller user (User 4) of the specific item (Item 4), and adds the individual prices (1,000 yen, 2,000 yen) of the unpurchased (all) parent items (Items 3 and 2) to the sales amounts of the seller users (Users 3 and 2) of the unpurchased (all) parent items (Items 3 and 2), respectively, and then the procedure proceeds to Step S34. 1,000 yen is added to the sales amount of User 3, and 2,000 yen is added to the sales amount of User 2.

Step S33: The controlling part 12 refers to the item table 133, identifies the seller user and the individual price of the specific item, and adds the individual price to the sales amount of the seller user, and then the procedure proceeds to Step S34.

Step S34: The controlling part 12 determines whether or not a predetermined closing date has come. In a case where the closing date has come (Step S34: YES), the procedure proceeds to the next Step S35, and in a case where the closing date has not come (Step S34: NO), the procedure returns to the first Step S21.

Step S35: The controlling part 12 transfers, to a payee account specified by each user an amount of money which is the sales amount (sales amount) of the user in the user table 132 minus a predetermined fee. And then the controlling part 12 resets the sales amounts in the user table 132 to zero, and the procedure returns to the first Step S21. Note that since processes related to money transfer are known, explanations thereof are omitted here.

11. Advantageous Effects of Embodiment

As explained above, the trading support server 10, the trading support system 100, and the trading support program 131 according to the present embodiment support user-to-user trading of items which are 3D modeling data such as avatars to be used in a metaverse, and causes seller users to specify individual prices that should be reflected in their own sales amounts when sales items are traded, and parent items used to create the sales items. Accordingly, individual prices, parent items, and seller users can be managed in the storing part 13 in association with sales items.

Then, on the basis of information (various types of table) stored on the storing part 13, the trading support server 10, the trading support system 100, and the trading support program 131 according to the present embodiment can identify a parent item of a specific item, an individual price of the parent item, and a seller user of the parent item in a case where a purchaser user who wishes to purchase the specific item has appeared. Accordingly, it is possible to charge the purchaser user individual prices of both the specific item and the parent item, add the individual price of the specific item to a sales amount of the seller user of the specific item, and add a sales amount of the parent item to a sales amount of the seller user of the parent item.

Accordingly, the trading support server 10, the trading support system 100, and the trading support program 131 according to the present embodiment make it possible to protect profits of both seller users of items and seller users of parent items used to create the items.

12. Modification Examples Related to Resale

Permission (For All Users)

Note that it is desirable if the controlling part 12 of the trading support server 10 (or the administrator of the server 10) according to the embodiment mentioned above acquires resale permission in advance from a registration user (e.g. at the time when the user performs user registration, and the like) in order to avoid unnecessary disputes. The "resale permission" mentioned here means permission for (all) other users to put up other items using sales items of the registration user as parent items.

13. Modification Examples Related to Resale

Permission (For Each User)

In addition, the controlling part 12 of the trading support server 10 according to the embodiment or modification examples mentioned above may cause each user to choose whether to or not to give resale permission to other users. In that case, for example, it is sufficient if the controlling part 12 executes a process in which: information representing whether or not a user has given resale permission to other users is stored in advance in user registration details of the user table 132 in FIG. 4; when a result of the determination at Step S13 in FIG. 9 is YES, it is determined whether or not users who have put up declared parent items (and superior rank parent items) for sale include a resale-unpermitting user; in a case where a resale-unpermitting user is not included, the procedure proceeds to the next Step S14; in a case where a resale-unpermitting user is included, a notification that it is not possible to put up the sales item for sale is given to a user communication device; and the procedure returns to the first Step S11. In addition, the controlling part 12 may grant a privilege (resale permission privilege) to resale-permitting users. For example, the resale permission privilege is granted by any one of the following processes.

(1) A process in which a fee to be charged at the time when a resale-permitting user has traded an item is made lower than a fee to be charged at the time when a resale-unpermitting user has traded an item.

(2) A process in which points, a coupon, or the like that can be used at the time of purchase of an item are/is granted to a resale-permitting user.

14. Modification Examples Related to Resale

Permission (For Each Item)

Whereas it is assumed in the embodiment or modification examples described above that each user can set whether to or not to give resale permission, each user may be allowed to set whether to or not to give resale permission for each sales item. In that case, for example, it is sufficient if the controlling part 12 executes a process in which: information representing whether or not an item has been resale-permitted is stored in advance in item registration details of the item table 133 in FIG. 5; when a result of the determination at Step S13 in FIG. 9 is YES, it is determined whether or not declared parent items (and superior rank parent items) include a resale-unpermitted item; in a case where a resale-unpermitted item is not included, the procedure proceeds to the next Step S14; in a case where a resale-unpermitted item is included, a notification that it is not possible to put up the sales item for sale is given to a user communication device; and the procedure returns to the first Step S11. In addition, the controlling part 12 may execute such a process that the competitiveness of resale-permitted sales items is made higher than the competitiveness of resale-unpermitted sales items. For example, it is any one of the following processes.

(1) A process in which a fee to be charged at the time when a resale-permitted item is traded is made lower than a fee to be charged at the time when a resale-unpermitted item is traded.

(2) A process in which search results rankings of resale-permitted items in a case where a purchaser user tries to view items (a list of sales items) that are put up for sale on her/his own communication device are made higher than search results rankings of resale-unpermitted items (a weighting process, etc.).

(3) A process in which resale-permitted items are displayed in such a manner that they are more noticeable than resale-unpermitted items in a case where a purchaser user tries to view items (a list of sales items) that are put up for sale on her/his own communication device (a process in which display sizes are increased, and so on).

15. Modification Examples of Currency

Whereas a currency is used as a means for item exchanges in the embodiment or modification examples described above, it is not needless to say that, instead of a currency or in addition to a currency, a currency that can be used only in the platform (platform-specific currency), points, coupons, and the like may be used.

16. Modification Examples of Function Allocation

In addition, in the trading support system 100 according to the embodiment or modification examples mentioned above, information stored on the storing part 13 may be stored on a plurality of storage devices separately, or part or the whole of information stored on the storing part 13 may be stored on the side of the data server 20.

In addition, in the trading support system 100 according to the embodiment or modification examples mentioned above, at least some of the functions of the data server 20 or the payment server 30 may be implemented on the side of the trading support server 10.

In addition, in the trading support system 100 according to the embodiment or modification examples mentioned above, at least some of the functions of the trading support server 10 may be implemented on the side of the data server 20 or the payment server 30, or may be implemented on the side of another server.

In addition, in the trading support system 100 according to the embodiment or modification examples mentioned above, some of the functions of the trading support server 10 may be implemented on the side of the communication devices 50-1, 50-1, . . . .

17. Modification Examples of Items

In addition, whereas items are avatars and additional items for avatars (hairstyles, costumes, accessories, etc.) that are used in a metaverse which is one type of virtual space in the trading support system 100 according to the embodiment or modification examples mentioned above, items may be 3D modeling data of other objects (terrain profile objects, animal/plant objects, building objects, vehicle objects, small-article object, etc.) that are used in a virtual space such as a metaverse, or items may be other electronic data of copyrighted works (audio data, image data, video data, animation data, text data, program data, etc.) that are used in a virtual space such as a metaverse. This is because there is a possibility that any copyrighted work can be traded as electronic data, and can be subjected to processing or modification, and accordingly it is desirable if the trading support system 100 according to the embodiment or modification examples mentioned above protects profits of both a seller user of an item and seller users of parent items used to create the item.

18. About Accounting Process

Whereas an administrator of a server collects fees from users who have put up items for sale in the embodiment or modification examples mentioned above, the administrator may collect fees from users who have purchased items. In this manner, in the embodiment or modification examples mentioned above, any of known methods can be adopted as a method for accounting processes.

19. Others

The present invention is not limited to the embodiment or modification examples mentioned above, but can be embodied by modifying constituent elements as appropriate within the scope not departing from the gist of the present invention. In addition, various inventions can be formed by combining a plurality of constituent elements disclosed in each embodiment as appropriate.

REFERENCE SIGNS LIST

100: Trading support system
1: User
2: User
3: User
4: User
10: Trading support server
20: Data server
30: Payment server
40: Communication network
50-1: Communication device
50-2: Communication device
11: Communication part
12: Controlling part
121: Item management part
122: Tree management part
123: Charging part
124: Distributing part
13: Storing part
131: Trading support program
132: User table
133: Item table
134: Modifying tree table
135: Purchase history table
136: Payment table

The invention claimed is:

1. A trading support server that supports user-to-user trading of items which are electronic data to be used in a virtual space, the trading support server comprising:
   a communication interface;
   a memory storing:
      an item table;
      a modifying tree table; and
      a purchase history table including information representing a purchase history of a plurality of users; and
   a processor programmed to:
      store a seller user who wishes to put up a sales item for sale, the sales item that the seller user puts up for sale, and an individual price that should be reflected in a sales amount of the seller user when the sales item is traded in association with each other in the item table;
      cause the seller user to declare a parent item used to create the sales item;

store information for identifying the parent item in association with the sales item in the modifying tree table;
determine whether a purchase user has requested to purchase a specific sales item;
upon a determination that the purchase user has requested to purchase the specific sales item, refer to the modifying tree table to determine whether a parent item is associated with the specific sales item;
in response to a determination that the parent item is associated with the specific sales item in the modifying tree table, refer to the stored purchase history table and determine whether the purchase user has already purchased the parent item associated with the specific sales item;
in response to a determination that the purchase user has not already purchased the parent item associated with the specific sales item:
refer to the item table, access an individual price of the specific sales item and an individual price of the parent item, and add the accessed individual prices of both the specific sales item and the parent item to a charged amount to be charged to the purchaser user;
transmit, via the communication interface, to a terminal of the purchaser user, an offer to sell the specific sales item for the charged amount;
determine, via the communication interface, whether the purchaser user has purchased the specific sales item for the charged amount;
in response to a determination that the purchaser user has purchased the specific sales item for the charged amount:
refer to the item table to determine the individual price of the specific sales item;
add the individual price of the specific sales item to a sales amount of the seller user of the specific sales item;
refer to the item table to determine the individual price of the parent item;
add the individual price of the parent item to a sales amount of a seller user of the parent item;
transfer, via the communication interface, the sales amount to a terminal of the seller user of the specific sales item; and
transfer, via the communication interface, the sales amount to a terminal of a seller user of the parent item; and
in response to a determination that the purchase user has already purchased the parent item associated with the specific sales item:
refer to the item table, access the individual price of the specific sales item and set the individual price of the specific sales item as the charged amount to be charged to the purchaser user;
transmit, via the communication interface, to the terminal of the purchaser user, the offer to sell the specific sales item for the charged amount;
determine, via the communication interface, whether the purchaser user has purchased the specific sales item for the charged amount; and
in response to a determination that the purchaser user has purchased the specific sales item for the charged amount:
refer to the item table to determine the individual price of the specific sales item;
add the individual price of the specific sales item to a sales amount of the seller user of the specific sales item without adding anything to the sales amount of the seller user of the parent item; and
transfer, via the communication interface, the sales amount to the terminal of a seller user of the specific sales item.

2. The trading support server according to claim 1, wherein, in a case where it is determined on a basis of information stored in the memory that a superior rank parent item is further associated with the parent item, the processor is programmed to also add an individual price of the superior rank parent item to the charged amount.

3. The trading support server according to claim 1, wherein the parent item is associated with the specific sales item in the modifying tree table even in a case where only part of the parent item is-was used to create the sales item.

4. The trading support server according to claim 1, wherein
the virtual space is a metaverse, and
the electronic data includes 3D modeling data of an avatar which is a type of object that can be used in the metaverse, and 3D modeling data of an additional item for the avatar.

5. A trading support system comprising:
the trading support server according to claim 1; and
a data server that stores electronic data of a plurality of sales items put up for sale by a plurality of the seller users.

6. A non-transitory computer-readable storage medium storing a trading support program that causes a computer to function as a trading support server that supports user-to-user trading of items which are electronic data to be used in a virtual space, the computer-readable trading support program causing the computer to execute:
store a seller user who wishes to put up a sales item for sale, the sales item that the seller user puts up for sale, and an individual price that should be reflected in a sales amount of the seller user when the sales item is traded in association with each other in an item table stored in a memory;
cause the seller user to declare a parent item used to create the sales item;
store information for identifying the parent item in association with the sales item in a modifying tree table stored in the memory;
determine whether a purchase user has requested to purchase a specific sales item;
upon a determination that the purchase user has requested to purchase the specific sales item, refer to the modifying tree table to determine whether a parent item is associated with the specific sales item;
in response to a determination that the parent item is associated with the specific sales item in the modifying tree table, refer to a purchase history table stored in the memory and determine whether the purchase user has already purchased the parent item associated with the specific sales item;
in response to a determination that the purchase user has not already purchased the parent item associated with the specific sales item:
refer to the item table, access an individual price of the specific sales item and an individual price of the parent item, and add the accessed individual prices of both the specific sales item and the parent item to a charged amount to be charged to the purchaser user;
transmit, via a communication interface, to a terminal of the purchaser user, an offer to sell the specific sales item for the charged amount;
determine, via the communication interface, whether the purchaser user has purchased the specific sales item for the charged amount;
in response to a determination that the purchaser user has purchased the specific sales item for the charged amount:
refer to the item table to determine the individual price of the specific sales item;
add the individual price of the specific sales item to a sales amount of the seller user of the specific sales item;
refer to the item table to determine the individual price of the parent item;
add the individual price of the parent item to a sales amount of a seller user of the parent item;
transfer, via the communication interface, the sales amount to a terminal of the seller user of the specific sales item; and
transfer, via the communication interface, the sales amount to a terminal of a seller user of the parent item; and
in response to a determination that the purchase user has already purchased the parent item associated with the specific sales item:
refer to the item table, access the individual price of the specific sales item and set the individual price of the specific sales item as the charged amount to be charged to the purchaser user;
transmit, via the communication interface, to the terminal of the purchaser user, the offer to sell the specific sales item for the charged amount;
determine, via the communication interface, whether the purchaser user has purchased the specific sales item for the charged amount; and
in response to a determination that the purchaser user has purchased the specific sales item for the charged amount:
refer to the item table to determine the individual price of the specific sales item;
add the individual price of the specific sales item to a sales amount of the seller user of the specific sales item without adding anything to the sales amount of the seller user of the parent item; and
transfer, via the communication interface, the sales amount to the terminal of a seller user of the specific sales item.

7. A trading support server that supports user-to-user trading of items which are electronic data to be used in a virtual space, the trading support server comprising:
a communication interface;
a memory storing:
an item table;
a modifying tree table; and
a processor programmed to:
store a seller user who wishes to put up a sales item for sale, the sales item that the seller user puts up for sale, and an individual price that should be reflected in a sales amount of the seller user when the sales item is traded in association with each other in the item table;
cause the seller user to declare a parent item used to create the sales item;
store information for identifying the parent item in association with the sales item in the modifying tree table;
in a case where it is determined that the parent item is not permitted re-sale, notify the purchase user's terminal that the sales item is not permitted sale via the communication interface, and does not store information about the sales item in the item table and the modifying tree table, in order to prevent the sales item put up for sale;
cause a list of sales items to be displayed on a display of a purchase user's terminal in a manner in which sales items for which re-sale is permitted are displayed in a manner more noticeable to the purchase user than sales items for which re-sale is not permitted;
determine whether a purchase user has requested to purchase a specific sales item by selecting the sales item for purchase on the purchase user's terminal;
upon a determination that the purchase user has requested to purchase the specific sales item, refer to the modifying tree table to determine whether a parent item is associated with the specific sales item;
in response to a determination that the parent item is associated with the specific sales item in the modifying tree table, refer to the item table, access an individual price of the specific sales item and an individual price of the parent item, and add the accessed individual prices of both the specific sales item and the parent item to a charged amount to be charged to the purchaser user;
transmit, via the communication interface, to the terminal of the purchaser user, an offer to sell the specific sales item for the charged amount;
determine, via the communication interface, whether the purchaser user has purchased the specific sales item for the charged amount;
in response to a determination that the purchaser user has purchased the specific sales item for the charged amount:
refer to the item table to determine the individual price of the specific sales item;
add the individual price of the specific sales item to a sales amount of the seller user of the specific sales item;
refer to the item table to determine the individual price of the parent item;
add the individual price of the parent item to a sales amount of a seller user of the parent item;
transfer, via the communication interface, the sales amount to a terminal of the seller user of the specific sales item; and
transfer, via the communication interface, the sales amount to a terminal of a seller user of the parent item.

8. The trading support server of claim 7, wherein the processor is programmed to cause the list of sales items to be displayed on the display of the purchase user's terminal in a manner in which sales items for which re-sale is permitted are displayed larger than sales items for which re-sale is not permitted.

9. The trading support server of claim 7, wherein the processor is programmed to cause the list of sales items to be displayed on the display of the purchase user's terminal in a manner in which sales items for which re-sale is permitted have a higher search result ranking than sales items for which re-sale is not permitted.

10. A non-transitory computer-readable storage medium storing a trading support program that causes a computer to function as a trading support server that supports user-to-user trading of items which are electronic data to be used in a virtual space, the computer-readable trading support program causing the computer to:

store a seller user who wishes to put up a sales item for sale, the sales item that the seller user puts up for sale, and an individual price that should be reflected in a sales amount of the seller user when the sales item is traded in association with each other in an item table stored in a memory;

cause the seller user to declare a parent item used to create the sales item;

store information for identifying the parent item in association with the sales item in a modifying tree table stored in the memory;

in a case where it is determined that the parent item is not permitted re- sale, notify the purchase user's terminal that the sales item is not permitted sale via the communication interface, and does not store information about the sales item in the item table and the modifying tree table, in order to prevent the sales item put up for sale;

cause a list of sales items to be displayed on a display of a purchase user's terminal in a manner in which sales items for which re-sale is permitted is displayed in a manner more noticeable to the purchase user than sales items for which re-sale is not permitted;

determine whether a purchase user has requested to purchase a specific sales item by selecting the sales item for purchase on the purchase user's terminal;

upon a determination that the purchase user has requested to purchase the specific sales item, refer to the modifying tree table to determine whether a parent item is associated with the specific sales item;

in response to a determination that the parent item is associated with the specific sales item in the modifying tree table, refer to the item table, access an individual price of the specific sales item and an individual price of the parent item, and add the accessed individual prices of both the specific sales item and the parent item to a charged amount to be charged to the purchaser user;

transmit, via a communication interface, to a terminal of the purchaser user, an offer to sell the specific sales item for the charged amount;

determine, via the communication interface, whether the purchaser user has purchased the specific sales item for the charged amount;

in response to a determination that the purchaser user has purchased the specific sales item for the charged amount:

refer to the item table to determine the individual price of the specific sales item;

add the individual price of the specific sales item to a sales amount of the seller user of the specific sales item;

refer to the item table to determine the individual price of the parent item;

add the individual price of the parent item to a sales amount of a seller user of the parent item;

transfer, via the communication interface, the sales amount to a terminal of the seller user of the specific sales item; and transfer, via the communication interface, the sales amount to a terminal of a seller user of the parent item.

11. The non-transitory computer-readable storage medium of claim 10, wherein the program causes the computer to cause the list of sales items to be displayed on the display of the purchase user's terminal in a manner in which sales items for which re-sale is permitted is displayed larger than sales items for which re-sale is not permitted.

12. The non-transitory computer-readable storage medium of claim 10, wherein the program causes the computer to cause the list of sales items to be displayed on the display of the purchase user's terminal in a manner in which sales items for which re-sale is permitted has a higher search result ranking than sales items for which re-sale is not permitted.

* * * * *